(12) United States Patent
Patel

(10) Patent No.: US 8,273,163 B2
(45) Date of Patent: *Sep. 25, 2012

(54) FLAME-RETARDANT HYDROCARBON ADSORPTION TRAP

(75) Inventor: Ankur Patel, Troy, MI (US)

(73) Assignee: Mann & Hummel GmbH, Ludwigsburg (DE)

( * ) Notice: Subject to any disclaimer, the term of this patent is extended or adjusted under 35 U.S.C. 154(b) by 427 days.

This patent is subject to a terminal disclaimer.

(21) Appl. No.: 12/570,107

(22) Filed: Sep. 30, 2009

(65) Prior Publication Data
US 2011/0072974 A1    Mar. 31, 2011

(51) Int. Cl.
B01D 53/02    (2006.01)

(52) U.S. Cl. .............. 96/134; 96/154; 55/486

(58) Field of Classification Search ............. 55/385.3, 55/487, 486; 96/130, 131, 144, 153, 147, 96/134, 154; 95/146; 422/173; 123/516, 123/519; 442/315, 414, 381, 415, 408, 402, 442/405, 407, 403, 366, 378; 428/219, 920, 428/921; 524/432, 419, 424, 431, 414, 420, 524/413

See application file for complete search history.

(56) References Cited

U.S. PATENT DOCUMENTS

| | | | |
|---|---|---|---|
| 3,686,837 A * | 8/1972 | Hopkins et al. ............. 55/487 |
| 5,153,753 A * | 10/1992 | Ohta et al. ................. 349/51 |
| 5,914,294 A | 6/1999 | Park et al. |
| 5,914,457 A * | 6/1999 | Itakura et al. ............... 96/130 |
| 7,094,268 B2 * | 8/2006 | Krantz ..................... 55/385.3 |
| 7,531,029 B2 * | 5/2009 | Hoke et al. ................ 96/134 |
| 7,578,285 B2 * | 8/2009 | Buelow et al. ............ 123/516 |
| 8,025,132 B2 * | 9/2011 | Krantz .................. 188/218 A |
| 2004/0226440 A1 * | 11/2004 | Foong et al. ............... 95/146 |
| 2005/0215158 A1 * | 9/2005 | Hartgrove et al. ........ 442/414 |
| 2005/0223894 A1 | 10/2005 | Sohnemann |
| 2006/0121238 A1 * | 6/2006 | Hensler et al. ............. 428/95 |
| 2007/0130896 A1 | 6/2007 | Walz et al. |
| 2009/0301304 A1 * | 12/2009 | Bass et al. ................. 95/273 |
| 2009/0311933 A1 * | 12/2009 | Mihoichi et al. .......... 442/315 |
| 2010/0029156 A1 * | 2/2010 | Tanaka et al. ............. 442/136 |
| 2011/0072974 A1 * | 3/2011 | Patel ....................... 96/147 |
| 2011/0100223 A1 * | 5/2011 | Tarrant et al. ............. 96/147 |
| 2011/0165397 A1 * | 7/2011 | Roe et al. ................. 428/219 |
| 2011/0200784 A1 * | 8/2011 | Agarwal et al. ........... 428/97 |
| 2011/0274869 A1 * | 11/2011 | Bernhard et al. ........... 428/74 |
| 2011/0275263 A1 * | 11/2011 | Li et al. ................... 442/142 |

* cited by examiner

Primary Examiner — Duane Smith
Assistant Examiner — Minh-Chau Pham
(74) Attorney, Agent, or Firm — James Hasselbeck

(57) ABSTRACT

A flame-retardant hydrocarbon adsorption trap is adapted for mounting within an air intake tract. The traps includes a hydrocarbon vapor adsorbent media adapted to adsorb hydrocarbon vapors from an intake tract when an engine is not operating then later releasing the vapors when the engine runs. The trap includes at least two air permeable HCA media retention layers positioned in a spaced parallel relationship and forming a gap there-between into which hydrocarbon vapor adsorbent media is received. The retention layers are formed of a synthetic fiber media adapted to provide flame-resistant properties.

17 Claims, 2 Drawing Sheets

FLAME-RETARDANT HYDROCARBON ADSORPTION TRAP

TECHNICAL FIELD

The invention relates to devices for trapping hydrocarbon vapors such as fuel vapors in the air intake system of an internal combustion engine and, more particularly, to hydrocarbon adsorption traps having flame-retardant properties.

BACKGROUND OF THE INVENTION

An air intake tract for an internal combustion engine may include an air filter housing in an air filter housing (also known as an air cleaner), possibly a throttle body, and possibly intake air pressure, temperature and mass air flow sensors, among other devices. The intake air tract may be equipped to receive vented engine crankcase vapors into the intake air stream so as to prevent their release into the environment. When an internal combustion engine is shutdown, hydrocarbon vapors from fuel, lubricating oil and other hydrocarbon vapor sources may accumulate within the engine air intake duct as airflow to the engine is no longer drawing the hydrocarbon vapors into the engine to be burned. It is desirable to trap these hydrocarbon vapors within the air intake system to prevent their release into the outside environment. Hydrocarbon vapors are known to be a significant contributing component in urban smog and so their control is desirable.

Gasoline, for example, is a highly volatile hydrocarbon fuel that includes components which transition easily from a liquid to vapor phase. Elevated temperatures such as occurring during normal internal combustion engine operation accelerate the liquid to vapor transition. The hydrocarbon vapors, unless treated or captured, may ultimately discharge into the atmosphere. It is known that hydrocarbon vapors are discharged from the engine crankcase during engine operation. When the engine is shutdown, these vapors may continue to be released from the hot engine crankcase and other components, particularly as the engine cools.

The control of hydrocarbon vapors escaping into the environment is regulated by state and federal regulations. Hydrocarbon traps for capturing hydrocarbon vapors are well known. For example, motor vehicles are commonly equipped with hydrocarbon adsorptive emissions canisters connected to the fuel tank for trapping hydrocarbon vapors, particularly as emitted during refueling.

It is known that certain porous materials such as activated carbon are useful for absorption and removal of organic hydrocarbon vapors. It is known hydrocarbon vapors are liquefied within small micro pores of the activated carbon and may be retained by absorption.

Flow-through types of hydrocarbon traps are known. As air flow must pass through restrictions in such flow-through traps, these traps present an undesired restriction to the air flow.

Various types of hydrocarbon traps for capturing hydrocarbon vapors are known in the art. For example, U.S. Pat. No. 5,914,294 discloses a monolithic trap which adsorbs chemical constituents from a gas stream. This is achieved by bringing the gas into direct contact with the activated carbon in the monolith. One disadvantage of this type of extruded or press formed hydrocarbon trap is that the extrusion and binding process results in a relatively brittle trap that may crack or have individual pieces flake off.

Another example is U.S. Published Application 2005/0223894 which discloses an adsorption element for adsorbing gases and vapors from the intake tract of an engine. The adsorption element has free-flow channels in an element having a spacer layer and an adsorption layer. One disadvantage of this type of corrugated trap is that the trap itself introduces a restriction to airflow in the intake tract.

U.S. Published Application 2007/0130896 discloses a flow-though air filter which includes an upstream filter fleece. The filter fleece is adapted to provide a flame-retardant effect to the air filter. A hydrocarbon trap is not disclosed.

U.S. patent application Ser. No. 12/512,389 (unpublished as of this writing) discloses a hydrocarbon adsorption trap configured for installation into an air intake tract.

Internal combustion engines, particularly diesel engines, may backfire into the air intake tract, discharging superheated combustion byproducts and fuel vapors into the air intake tract. Such a backfire event presents a risk that the hydrocarbon adsorption trap (HCA trap) may ignite and at least partially burn.

Therefore, there remains a need in the art for a hydrocarbon adsorption trap that is flare-resistant, rugged, low in cost, and does not present a restriction to air flow in the air intake tract.

SUMMARY OF THE INVENTION

In at least one aspect of the invention, a flame-retardant hydrocarbon adsorption trap is provided and adapted for the adsorption of hydrocarbon vapors present within an internal combustion engine air intake tract. The hydrocarbon adsorption trap includes a hydrocarbon vapor adsorbent media configured and adapted for adsorbing hydrocarbon vapors from the intake tract when an engine is not operating and then releasing the vapors back into the intake tract when the engine restarts. At least two air permeable HCA media retention layers are positioned in a spaced parallel relationship to form a gap there-between into which the hydrocarbon vapor adsorbent media is received. The retention layers are formed of synthetic fiber media that is treated or adapted to provide flame-resistant properties to the hydrocarbon adsorption trap.

In another aspect of the invention, the hydrocarbon adsorption trap includes a mounting member secured onto a peripheral edge portion or portions of the media retention layers and projecting outwards away from the media retention layers. The mounting member is configured to seal the gap existing between the media retention layers along the edge portion so as to operatively close the edges of the gap and thereby retain the adsorbent media in position between the layers. The mounting member is configured and adapted for mounting the adsorption trap within the air intake tract.

In another aspect of the invention, the flame-resistant properties are achieved by addition and application of a chemical flame-retardant treatment onto the synthetic fiber media utilizing a dipping, coating or spray process.

In another aspect of the invention, the chemical flame-retardant treatment includes phosphate or antimony trioxide.

In another aspect of the invention, the flame-resistant properties are provided to the synthetic fibers by chemically bonding a flame-retardant agent in preparing a fiber polymer prior to extruding the fibers for use in the fiber media.

In another aspect of the invention, the flame retardant agent chemically bound prior to extrusion is a phosphorous containing compound.

In another aspect of the invention, the flame-retardant treatment is an inorganic flame-retardant selected from the set including: aluminum hydroxide, magnesium hydroxide, boron containing compounds, antimony oxides and inorganic phosphorus compounds, magnesium hydroxide, zinc borate, barium metaborate, alumina trihydrate, zinc oxide, ammonium octamolybdate, antimony trioxide and magnesium distearate.

In another aspect of the invention, the flame-resistant properties are provided by utilizing a mixture of synthetic fibers together with inherently flame resistant fibers to form the synthetic fiber media.

In another aspect of the invention, the inherently flame-resistant fibers are selected from the set including: aromatic polyamide fibers, modified acrylic fibers, flame-resistant polynosic, flame-resistant vinylon, flame-resistant polyester, oxidation acrylic fibers, rayon carbonized fibers, aramid fibers, polyacrylonitrile fibers, metallic fibers, and silica fibers.

In another aspect of the invention, the flame resistance synthetic fiber media includes a non-woven polyester fleece.

In another aspect of the invention, the mounting member includes a material selected from the group consisting of plastisol, polyurethane or polyester blend. The mounting member is adapted to be flame-resistant.

In another aspect of the invention, the flame resistant adaptation of the mount member includes a flame-retardant selected from the set including: antimony oxide, magnesium hydroxide, zinc borate, barium metaborate, alumina trihydrate, zinc oxide, ammonium octamolybdate and magnesium distearate.

In another aspect of the invention, the adsorbent media includes activated carbon granules for adsorbing hydrocarbon vapors.

In another aspect of the invention, the activated carbon granules are bound together by an adhesive with the adhesive maintaining the granules in a desired spaced distribution between the layers.

In another aspect of the invention, the mounting member circumferentially extends about, secures to and closes over all of the edge portions of the media retention layers.

In another aspect of the invention, the securing of the mounting member to the media retention layers is provided by any of: injection molding, vibration welding or heat welding.

In another aspect of the invention, the hydrocarbon adsorption trap further includes at least one supplemental layer disposed between and in a spaced parallel relationship to the media retention layers. The supplemental layers arranged to divide the gap existing between the media retention layers into sub gaps. The hydrocarbon vapor adsorbent media is disposed in the sub gaps.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
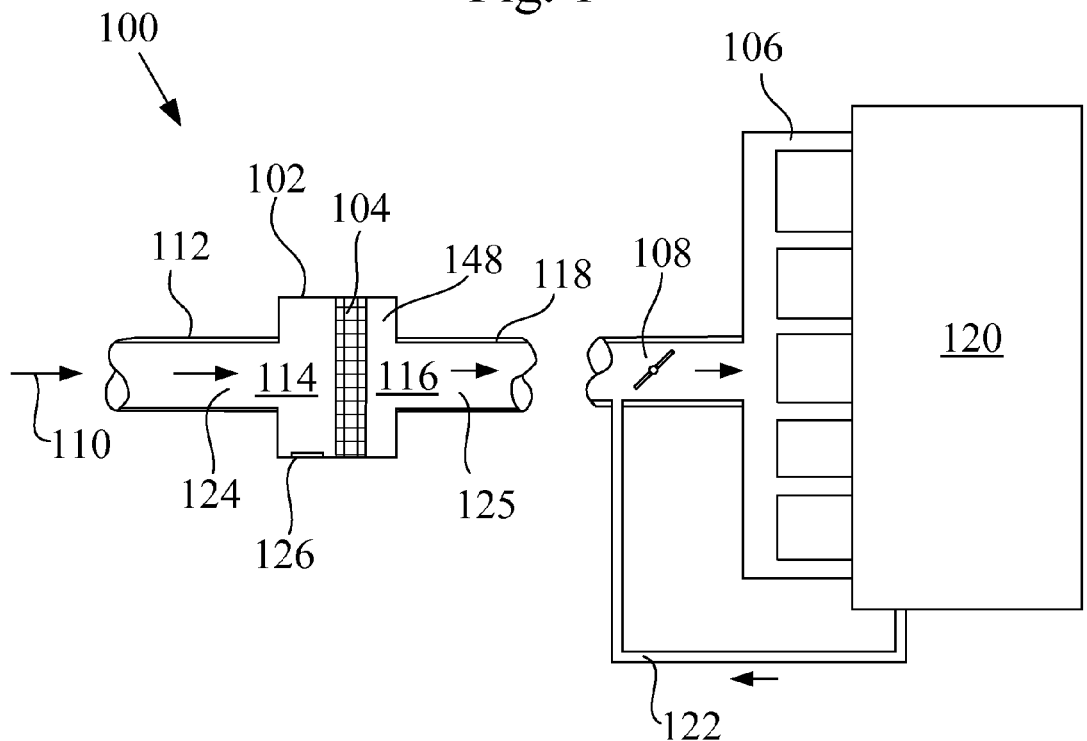
FIG. 1 is a schematic diagram of an air intake tract for an internal combustion engine equipped with a flame retardant hydrocarbon trap, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a flame-retardant hydrocarbon adsorption trap for an engine air intake tract as disclosed herein. Accordingly, the apparatus components may have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is a schematic diagram of an air intake tract for an internal combustion engine equipped with a flame-retardant hydrocarbon trap, consistent with the present invention. The air cleaner 102 housing defines a chamber 148 therein. An air filter element 104 is received into the chamber 148 and divides the chamber 148 into a dirty side 114 and a clean side 116. A vacuum induced by the operation of the internal combustion engine 120 acts to draw outside air stream into the intake tract 100 through intake tract portion 112. The air stream enters the inlet port 124 of the air cleaner 102 to be received at the dirty side 114 of the air cleaner. The air stream flows through the filter element 104 to the clean side 116 of the air cleaner 102. The filter element 104 is adapted and configured to block the passage of particulates that may be present in the outside air stream. The now relatively clean intake air stream exits the outlet port 125 to be drawn along intake tract portion 118, perhaps passing through throttle body 108 (if present) and then entering the intake manifold 106 of internal combustion engine 120. FIG. 1 also depicts an optional crankcase vent line 122. For environmental reasons and to meet regulatory requirements, oil and fuel vapors from the crankcase of engine 120 may be vented back into the intake tract 100 such as through crankcase vent line 122, or other similar means, so as to be burned in the combustion cycle of the engine 120, thereby preventing the direct release of fuel and oil vapors (hydrocarbon vapors) into the environment.

When the internal combustion engine 120 shuts down after operation, volatilized hydrocarbon vapors may be present in the intake tract 100 and may continue venting from the crankcase through vent line 122, however these hydrocarbon vapors are no longer drawn into the intake manifold 106 to be burned, therefore hydrocarbon vapors may instead find their way along the intake tract portion 118 to eventually reach the air cleaner 102 and potentially discharge into the outside environment.

According to the present invention, a flame-retardant hydrocarbon absorptive trap 126 (or HCA trap) is provided, positioned within and secured to an interior portion of the air cleaner 102, preferably at the clean side 116. When the engine 120 is shutdown, hydrocarbon vapors may flow backwards through the air intake tract 100 to eventually reach the air cleaner 102. HCA trap 126 is operative to adsorb hydrocarbon vapors before they can reach the outside environment. The flame-retardant HCA trap 126 comprises an absorptive media such as activated carbon, zeolite, or other hydrocarbon vapor absorptive materials disposed between vapor permeable layers. Activated carbon is a preferred hydrocarbon adsorptive media as it is inexpensive, environmentally friendly and readily available.

As the HCA trap is operative to trap hydrocarbon vapors when the engine is shutdown and then later release the trapped vapors when the engine restarts, the HCA trap 126 has a relatively long life and therefore does not normally need to be replaced, therefore it is not necessary to provide a provision to replace the HCA trap. In embodiments presented herein, it is preferred that the HCA trap 126 be permanently secured within the air cleaner 102 and positioned in communication with the air flow but not obstructing the intake air flow through the air cleaner 102. Preferably the HCA trap 126 is permanently secured to an interior wall of the air cleaner 102, although the trap may instead be secured at any suitable location along the intake tract 100. By securing the HCA trap 126 to a sidewall of the air cleaner 102 or air intake tract 100, intake air flow may tangentially contact but is not required to pass through the HCA trap 126. This is advantageous as the HCA trap 126 positioned to the side of the air stream does not introduce an obstruction or restriction to air flow in the air intake tract 100.

As discussed above, when the engine 120 shuts down, hydrocarbon vapors within the air intake tract portion 118, such as present in the intake manifold 106 or rising from the crankcase through vent line 122, may migrate backwards up the air intake tract portion 118 towards the air cleaner 102. The movement or flow rate of these hydrocarbon vapors is quite slow, permitting the HCA trap 126 to be positioned off to the side of the air flow and to be exposed only tangentially to the migrating hydrocarbon vapor. The HCA trap 126 so positioned is operative to absorb these back flow hydrocarbon vapors due to the minimal flow rate and therefore the relatively long exposure time of the hydrocarbon vapors to the HCA trap 126.

When the engine 120 later restarts, then outside air entering the air cleaner 102 is brought into contact with the HCA trap 126 and causes the trapped hydrocarbon vapors to be released from the HCA trap 126 back into the intake tract 100 where they are available to be burned with the intake air stream delivered to the engine 120.

During operation of the engine 120, a backfire event may occur, emitting a pressurized flash of burning superheated combustion gases from the engine 120 backwards through the air intake tact 118 to reach the HCA trap 126. The heat and/or flame generated by this event may be sufficient to cause flammable components of a conventional HCA trap to ignite and burn. Advantageously, according to the present invention, the flame-retardant HCA trap 126 includes one or more flame-retardant media retention layers positioned between the hydrocarbon adsorptive media, binder etc and the air stream in air intake tract portion 118 (including the clean air side 148 of the air cleaner/air filter housing 102).

It is known that flammable materials are decomposed in the presence of oxygen to release chemical energy in the form of heat and light. For example, the combustion of a hydrocarbon may proceed as:

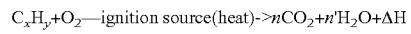

$$C_xH_y + O_2 \text{—ignition source(heat)} \rightarrow nCO_2 + n'H_2O + \Delta H$$

The combustion reaction takes place in the vapor phase. Pyrolysis (decomposition of a substance due to heating) of a flammable media may result in a combination of non-combustible gases, combustible gases and potentially combustible liquids. The gas mixture may ignite, resulting in flame and an exothermic feedback of heat to enable further pyrolysis and provide vapor phase fuel for further combustion.

Advantageously, various types of flame retardants may be applied onto, mixed with or chemically bound/reacted with hydrocarbon trap components during manufacturing to retard or extinguish the progression of flame, reducing the risk of a fire.

Known halogenated flame-retardants include chlorinated and brominated flame retardants. These flame-retardants act in the vapor phase by reducing the heat generated by flames thereby inhibiting the formation of flammable gases.

Phosphorus containing flame-retardants may be applied as additives to the material it is protecting. These additives act in the solid phase to thermally decompose forming phosphoric acid in the presence of heat. The decomposed acid coats the material to form "char" which acts to slow down the pyrolysis step of the combustion cycle, thereby removing available combustion fuel.

Nitrogen containing flame-retardants are known. These retardants may be used, for example, in foams, nylons and polymers.

Inorganic flame retardants undergo decomposition reactions in the presence of heat to release water or non-flammable gases which dilute the gases feeding the flames. The dilution further acts to adsorb heat energy to cool the fire and thereby mitigate the risk of damage. Inorganic flame-retardants may be applied as a non-flammable resistant layer onto a material surface. Known inorganic flame retardants include: aluminum hydroxide, magnesium hydroxide, boron containing compounds, antimony oxides and inorganic phosphorus compounds. The advantages of these compounds include that they are relatively low in cost and are easily incorporated into plastics or extruded fibers such as PET or polyester fibers. Other inorganic flame-retardants include (for example) magnesium hydroxide, zinc borate, barium metaborate, alumina trihydrate, zinc oxide, ammonium octamolybdate, antimony trioxide and magnesium distearate.

Preferably the media retention layers comprise a synthetic fiber material, for example a polymer material such as polyester, polyamide [nylon] or polypropylene. When using these fiber types a flame retardant, for example one of the phosphorus compounds, may be copolymerized to provide flame resistance.

In another embodiment, non-flammable fibers may be distributed homogeneously in the fibers making up the media retention layers.

Flame-proof and flame-resistant properties may be added to HCA media retention layers by specific treatments such as applying a flame retardant by a dipping or a coating process after preparing a fiber, or a woven or non-woven media retention layer. Flame-retardants may also be added to HCA fibers or HCA retention media by chemical bonding such as covalent bonding and/or by blending the flame-retardant with the fiber material in melting, extruding and spinning processes. Additionally flame-retardant materials may be applied to HCA media retention layers or layer materials using a spray coating or a dipping process.

Alternately, the HCA media retention layers may themselves utilize fibers that are by their nature are inherently flame-resistant. The flame resistant fibers may be distributed homogeneously in the fibers making up the media retention layers, preferably in proportions between 10% to 100%. Such flame resistant fibers include organic or inorganic fibers such as aromatic polyamide fibers, modified acrylic fibers, flame-resistant polynosic, flame-resistant vinylon, flame-resistant polyester, oxidation acrylic fibers, rayon carbonized fibers, aramid fibers, polyacrylonitrile fibers, metallic fibers, and silica fibers, among others. For an advantageous example, oxidized polyacrylonitrile fibers may be blended with synthetic fibers into the HCA media retention layers. Such oxidized polyacrylonitrile fibers do not burn or melt even at high temperatures up to approximately 700° C.

Figure 2A:
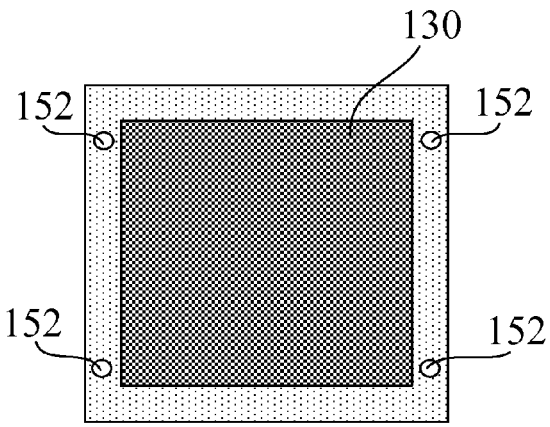
FIG. 2A is a schematic plan view of one embodiment of a flame retardant hydrocarbon absorption trap (HCA trap), consistent with the present invention.
Figure 2B:
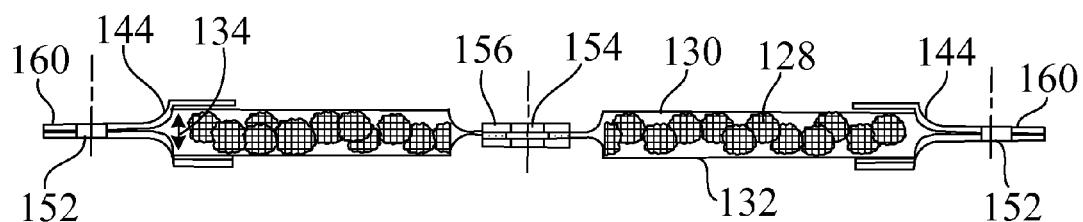
FIG. 2B is a sectional side view of a flame retardant hydrocarbon absorption trap (HCA trap) further depicting optional cutouts and through holes with annular barriers as present in some portion of, but not all, embodiments of the invention.

To explain by illustration, the discussion now continues with FIGS. 2A and 2B. FIG. 2A is a schematic plan view of one exemplary embodiment of a hydrocarbon absorption trap (HCA trap) 126, consistent with the present invention. FIG. 2B is a sectional side view of an embodiment of the hydrocarbon absorption trap also depicting cut-out(s) 154 and annular barrier(s) 156 as provided in some, but not all, embodiments of the invention. FIGS. 2A and 2B depict a generally rectangular and generally planar flame-retardant HCA trap, however it is to be understood that the illustrated shape was presented merely for presentation/discussion purposes and that the HCA trap may have any suitable shape as desired or required for mounting into an air cleaner or into the air intake tract. In FIG. 2B a hydrocarbon vapor absorptive media 128 is disposed and contained between a first hydrocarbon vapor permeable layer 130 and a second layer 132 positioned in a spaced parallel relationship to the first layer 130. As the HCA trap may be installed with the second layer 132 facing or contacting a wall of the air intake tract or air cleaner, the second layer is not required in all envisioned embodiments to be hydrocarbon vapor permeable although it is preferable that it is. The hydrocarbon vapor absorptive media 128 is disposed (preferably evenly distributed) in the gap 134 between the layers 130 and 132 and configured for absorbing hydrocarbon vapors from the intake tract 100, particularly when the engine 120 is not operating. The hydrocarbon vapor permeable layer 130 and optionally the second layer 132 may be realized as woven or non-woven synthetic fiber layers, for example polyester fiber layers. In some embodiments the layers 130 and/or 132 may be realized as synthetic fiber sheets. The layers 130 and 132 are adapted to be flame retardant using at least one of the disclosed flame retardant treatments, flame resistant fibers, or flame-resistant fiber blends such as discussed and presented in detail earlier above.

In FIG. 2B a synthetic fiber mounting member 144 is provided and secured to peripheral edge portions of the first 130 and second 132 layers, closing out the gap 134 between the layers 130 and 132 thereby insuring retention of the hydrocarbon vapor absorptive media 128 within the gap 134 between the layers 130 and 132. The mounting member projects generally outwards from the layers 130, 132 to provide a means to mount or secure the HCA trap within the air intake tract 100. The flame-resistant layers 130 and 132 together with the mounting member 144 fully enclose the hydrocarbon adsorptive media 128, providing a layer of isolation between the hydrocarbon adsorptive media 128 and the air stream. Through holes 152 may be provided extending through the mounting lip 160 of the mounting member 144, preferably positioned at opposing sides of the HCA trap 126. Screws, heat stakes or other mounting means may be received through the through holes 152 for securing the HCA trap 126 into the air cleaner 102 or air intake tract 100.

Preferably the HCA trap 126 is secured within the clean side 116 of the air cleaner housing 102. In other aspects of the invention, the HCA trap 126 may secured at any appropriate location within and along the intake tract 100, such as within intake tract portion 118 or on the dirty side of the air cleaner 102.

In various aspects of the invention the mounting member may be realized using materials such as non-woven polyester fleece, molded polyurethane or plastisol. Preferably the mounting member is secured to the layers 130 and 132 without the use of an adhesive. When a polyester synthetic fiber material is utilized to form the mounting member, the mounting member may be secured by ultrasonic welding or alternately hot iron welding onto the periphery of the layers 130, 132 (similar to the illustration of FIG. 2B).

Plastisol is a heat cured material adaptable to relatively simple slush molding or casting. As an alternate to polyester fibers, plastisol may be used to wet cast and secure the mounting member directly onto the peripheral portions of the layers 130 and 132. It is known that plastisol tends not to saturate or soak through the fibers of the synthetic hydrocarbon vapor permeable layers 130 and 132 and so advantageously does not migrate significantly into or occlude interior portions of the hydrocarbon vapor permeable layers 130 and 132. Alternately, polyurethane may be molded directly onto peripheral portions of the layers 130 and 132 thereby securing the polyurethane mounting member to the layers without the use of an adhesive.

Preferably, the mounting member is made flame-retardant by use of one or more of the flame-retardant compounds, flame retardant fibers, by mixing one or more flame-retardant compounds with the mounting member material during forming, by use of inherently non-flammable materials in at least a portion of the mount member material, by spray coating or by dipping into flame retardant materials, or by other methods such as described in detail earlier above.

Figure 2C:
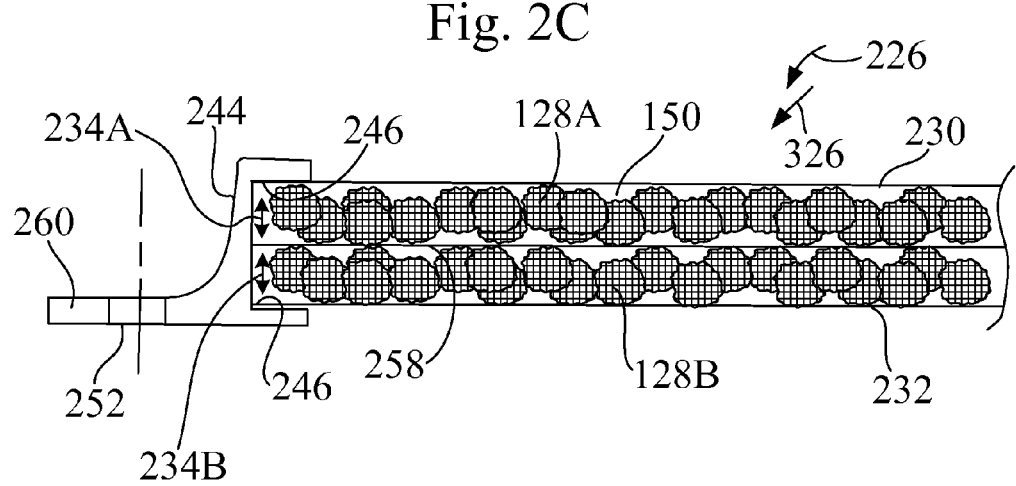
FIG. 2C is a partial sectional side view of another alternate embodiment of the flame retardant hydrocarbon absorption trap (HCA trap), consistent with the present invention.

FIG. 2C is a partial sectional side view of an alternate embodiment of the flame-retardant hydrocarbon absorption trap (HCA trap) illustrating stacked multiple flame-resistant hydrocarbon adsorption layers. In certain embodiments the HCA trap of FIG. 2C may be similarly represented in a top view as depicted in FIG. 2A. Preferably, the mounting member 244 is molded onto the periphery of the HCA trap 226 and sealably closing out the edges 246 of the flame resistant hydrocarbon vapor permeable layers 230 and 232. In some aspects of the invention, the mounting member 244 includes through holes 252 for securing the HCA trap into the air intake tract. In other aspects of the invention the mounting member may be secured to an interior wall of the air cleaner 102 or into a suitable location of the air intake tract 100 by application of an adhesive to portions of the mounting lip 260 of the mounting member 244 to adhesively bond the HCA trap 226 to an interior wall of the air cleaner 102 or air intake tract 100.

In at least one aspect of the invention, hydrocarbon vapor absorptive media 128 (or 128A, 128B) comprises activated charcoal granules. Activated charcoal has been found to be a suitable hydrocarbon vapor absorbing material due to its very large surface area to weight ratio together with its porous internal structure while also being readily available, environmentally friendly and relatively low in cost. Potential flammability of the activated charcoal granules is mitigated by their enclosure within the gap between the flame-resistant hydrocarbon vapor absorptive media layers.

In other aspects of the invention the hydrocarbon vapor absorptive media may comprise zeolite or alternately other absorbent materials having a structure of micro pores of suitable size to liquefy, absorb and thereby trap hydrocarbon vapors.

In some aspects of the invention, hydrocarbon vapor absorptive media (128, 128A, 128B), for example activated carbon granules, are at least weakly bonded together by the addition of a small amount of adhesive 150 to cohesively bond the activated carbon into a preferred sheet-like shape. The adhesive bonding agent helps to stabilize the form of the vapor absorptive media 128 so as to maintain a preferred relatively uniform distribution of the granules throughout the gap 134. Preferably the adhesive 150 includes flame-resistant properties such as provided by flame retardant compounds and methods discussed earlier. The adhesive 150 is advantageous not only to maintain the preferred thin sheet-like shape of the HCA trap 126, but also to maximize the exposed surface area of the hydrocarbon vapor absorptive media 128 over the hydrocarbon vapor permeable layer surface thereby optimizing removal of hydrocarbon vapors by maximizing available hydrocarbon adsorptive media surface area.

In some aspects of the invention, one or more cut-outs or holes 154 may optionally be provided extending through the hydrocarbon adsorptive media (128, 128A, 128B) and the bounding layers (130, 132, 230, 232) (for example as illustrated in FIG. 2B). The optional cut-outs or holes may be provided to provide additional mounting locations for securing the HCA trap, or to allow the HCA trap to be received around other air cleaner structural features or members that may otherwise interfere with installation of the flame-retardant HCA trap. The annular barrier 156 is provided to circumscribe the periphery of the cut-out or hole 154 to maintain sealed containment of the hydrocarbon adsorptive media (128, 128A, 128B) in the HCA trap. In some embodiments the annular barrier 156 may be realized by injection molding of polyurethane around the periphery of the cut-out 154. In other embodiments, the annular barrier 156 may be realized by providing rings of polyester material ultrasonically welded respectfully to the layers (130, 132, 230, 232) so as to circumscribe or surround the cutout(s) 154 (as illustrated in FIG. 2B).

As illustrated in FIG. 2C, in some aspects of the invention the HCA trap may be assembled with multiple hydrocarbon adsorptive media layers, for example hydrocarbon adsorptive media layers 128A and 128B stacked together to provide additional hydrocarbon adsorption capacity. At least one supplemental media retention layer 258 may be disposed between and in a spaced parallel relationship to the first and second layers 230 and 232 to supportively divide the gap between the first 230 and second 232 layers into sub gaps 234A and 234B.

Advantageously, the flame retardant HCA trap is designed to have air flow tangentially adjacent to but not therethrough, therefore air flow in the intake tract 100 is unrestricted by the presence of the HCA trap.

Advantageously, in preferred embodiments the flame-retardant HCA trap has a flexible sheet-like form, is light in weight and easily secured within the air intake tract or air cleaner.

Advantageously, the flame retardant HCA trap is simple in construction, low in cost with a long life and may be permanently secured within the air cleaner or air intake tract without a need for replacement.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

The invention claimed is:

1. A flame-retardant hydrocarbon adsorption trap for adsorption of hydrocarbon vapors within an air intake tract, comprising:
   a hydrocarbon vapor adsorbent media for adsorbing hydrocarbon vapors from said intake tract when an engine is not operating then releasing said vapors when said engine runs; and
   at least two air permeable HCA media retention layers positioned in a spaced parallel relationship and forming a gap there-between into which said hydrocarbon vapor adsorbent media is received,
   wherein said retention layers include synthetic fiber media, said fiber media has flame-proof or flame-resistant properties;
   wherein said trap is adapted for mounting into said air intake tract;
   wherein at least one of said retention layers is a woven or non-woven sheet of synthetic fibers;
   wherein retention layers and said hydrocarbon vapor adsorbent media form a flexible sheet-like hydrocarbon adsorption trap;
   a mounting member secured to peripheral edge portions of said media retention layers and projecting outwards therefrom,
   said mounting member sealing said gap at said layer edge portions, operatively closing edges of said gap, retaining said adsorbent media between said layers;
   wherein said mounting member includes a mounting lip arranged on opposing sides of said trap;
   wherein said mounting member is configured and adapted for supportively mounting said adsorption trap within said air intake tract;

wherein said mounting member has flame-resistant properties.

2. The hydrocarbon adsorption trap according to claim 1 wherein said mounting lip has at least one through-hole extending therethrough, said at least one through-hole operable for supportively mounting said adsorption trap within said air intake tract.

3. The hydrocarbon adsorption trap according to claim 1, wherein
said flame-resistant properties are realized by applying a chemical flame-retardant treatment to said synthetic fiber media utilizing a dipping, coating or spray process.

4. The hydrocarbon adsorption trap according to claim 3, wherein
said flame-retardant treatment includes phosphate or antimony trioxide.

5. The hydrocarbon adsorption trap according to claim 1, wherein
said flame-resistant properties are realized in said synthetic fibers by chemical bonding a flame-retardant agent in preparing a fiber polymer prior to extruding fibers for use in said fiber media.

6. The hydrocarbon adsorption trap according to claim 5, wherein
said flame retardant agent is a phosphorous compound.

7. The hydrocarbon adsorption trap according to claim 3, wherein
said flame-retardant treatment is an inorganic flame-retardant selected from the set including: aluminum hydroxide, magnesium hydroxide, boron containing compounds, antimony oxides and inorganic phosphorus compounds, magnesium hydroxide, zinc borate, barium metaborate, alumina trihydrate, zinc oxide, ammonium octamolybdate, antimony trioxide and magnesium distearate.

8. The hydrocarbon adsorption trap according to claim 1, wherein
said flame-resistant properties are provided by blending a mixture of synthetic fibers and flame resistant fibers together to form said synthetic fiber media.

9. The hydrocarbon adsorption trap according to claim 8, wherein
said flame-resistant fibers are selected from the set including: aromatic polyamide fibers, modified acrylic fibers, flame-resistant polynosic, flame-resistant vinylon, flame-resistant polyester, oxidation acrylic fibers, rayon carbonized fibers, aramid fibers, polyacrylonitrile fibers, metallic fibers, and silica fibers.

10. The hydrocarbon adsorption trap according to claim 1, wherein
said synthetic fiber media includes non-woven polyester fleece.

11. The hydrocarbon adsorption trap according to claim 2, wherein
said mounting member comprises a material selected from the group consisting of plastisol, polyurethane or polyester blend.

12. The hydrocarbon adsorption trap according to claim 11, wherein
said adaptation of said mount member includes a flame-retardant selected from the set including: antimony oxide, magnesium hydroxide, zinc borate, barium metaborate, alumina trihydrate, zinc oxide, ammonium octamolybdate and magnesium distearate.

13. The hydrocarbon adsorption trap according to claim 1, wherein
said adsorbent media includes activated carbon granules.

14. The hydrocarbon adsorption trap according to claim 13, wherein
said granules are bound together by an adhesive, said adhesive maintaining said granules in a desired spaced distribution between said layers.

15. The hydrocarbon adsorption trap of claim 2, wherein
said mounting member circumferentially extends about, secures to and closes over all of said edge portions of said layers.

16. The hydrocarbon adsorption trap of claim 2, wherein
said securing of said mounting member to said layers is provided by any of: injection molding, vibration welding or heat welding.

17. The hydrocarbon adsorption trap of claim 1, wherein said hydrocarbon adsorption trap further comprises
at least one supplemental layer disposed between and in a spaced parallel relationship to said media retention layers, said supplemental layers dividing said gap into sub gaps;
wherein said hydrocarbon vapor adsorbent media is disposed within said sub gaps.

* * * * *